(12) United States Patent
Mendes Rodrigues et al.

(10) Patent No.: US 10,896,509 B2
(45) Date of Patent: Jan. 19, 2021

(54) PROCESSING DIGITAL IMAGE TO REMOVE UNWANTED PORTION

(71) Applicant: FUJITSU LIMITED, Kawasaki (JP)

(72) Inventors: Eduarda Mendes Rodrigues, Northwood (GB); Serban Georgescu, London (GB); Joseph Townsend, High Wycombe (GB)

(73) Assignee: FUJITSU LIMITED, Kawasaki (JP)

(*) Notice: Subject to any disclaimer, the term of this patent is extended or adjusted under 35 U.S.C. 154(b) by 150 days.

(21) Appl. No.: 16/284,402

(22) Filed: Feb. 25, 2019

(65) Prior Publication Data

US 2019/0188855 A1 Jun. 20, 2019

Related U.S. Application Data

(63) Continuation of application No. PCT/GB2017/053050, filed on Oct. 9, 2017.

(30) Foreign Application Priority Data

Oct. 14, 2016 (GB) .................................. 1617444.3

(51) Int. Cl.
*G06T 7/11* (2017.01)
*G06T 7/187* (2017.01)
*G06T 7/00* (2017.01)

(52) U.S. Cl.
CPC .............. *G06T 7/11* (2017.01); *G06T 7/0004* (2013.01); *G06T 7/187* (2017.01); *G06T 2207/10132* (2013.01); *G06T 2207/20021* (2013.01)

(58) Field of Classification Search
None
See application file for complete search history.

(56) References Cited

U.S. PATENT DOCUMENTS 8,447,139 B2 * 5/2013 Guan ................... G06K 9/6257
382/291
8,879,837 B2 * 11/2014 Usher ................. G06F 16/5838
382/165

(Continued)

OTHER PUBLICATIONS

Wei et al., "Meaningful Regions Segmentation in CBIR", IEEE Int. Workshop VLSI Design & Video Tech., May 28-30, 2005, pp. 199-202 **.

(Continued)

*Primary Examiner* — Andrae S Allison
(74) *Attorney, Agent, or Firm* — Staas & Halsey LLP

(57) ABSTRACT

An image processing method to sample the image to generate patches. Feature vectors are extracted from the patches, and the extracted feature vectors are partitioned into clusters, where feature vectors in the same cluster share a common characteristic. A portion of interest in the image is segmented. An aggregate bounding region creation process is carried out by finding the largest segment and creating a bounding box around it; determining which cluster contains the most patches within the bounding box of the segment; and adding the patches of the determined cluster to an aggregate bounding region for the portion of interest. The aggregate bounding region creation process is repeated for each other segment in order of size. The resulting aggregate bounding region contains all the patches associated with the portion of interest. The patches which fall outside the resulting aggregate bounding region are then removed from the image.

18 Claims, 10 Drawing Sheets

(56) References Cited

U.S. PATENT DOCUMENTS

| | | | |
|---|---|---|---|
| 9,008,435 B2* | 4/2015 | Gokturk | G06K 9/46 |
| | | | 382/190 |
| 9,082,162 B2* | 7/2015 | Gokturk | G06T 7/0002 |
| 9,601,393 B2* | 3/2017 | Lee | H01L 22/12 |
| 9,715,629 B2* | 7/2017 | Ashbrook | G06F 16/58 |
| 10,205,871 B1* | 2/2019 | Goyal | G06K 9/3233 |
| 2016/0007970 A1 | 1/2016 | Dufour et al. | |
| 2016/0155237 A1 | 6/2016 | Hashiguchi | |
| 2016/0202213 A1 | 7/2016 | Volker et al. | |
| 2017/0177997 A1* | 6/2017 | Karlinsky | G06K 9/6271 |

OTHER PUBLICATIONS

Ri et al., "Semantic Image Segmentation Based on Spatial Context Relations", Fourth International Symposium on Information Science and Engineering, Dec. 14, 2012, pp. 104-108 **.

International Search Report and Written Opinion of the International Searching Authority dated Dec. 6, 2017 from International Patent Application No. PCT/GB2017/053050, 13 pages **.

* cited by examiner

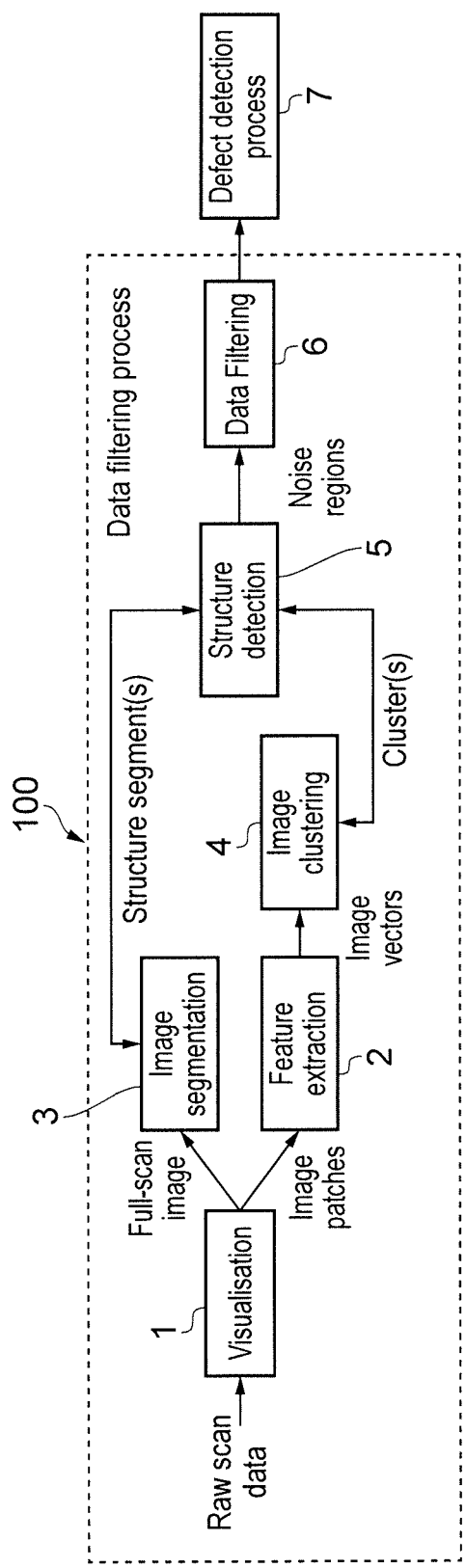
FIG. 1
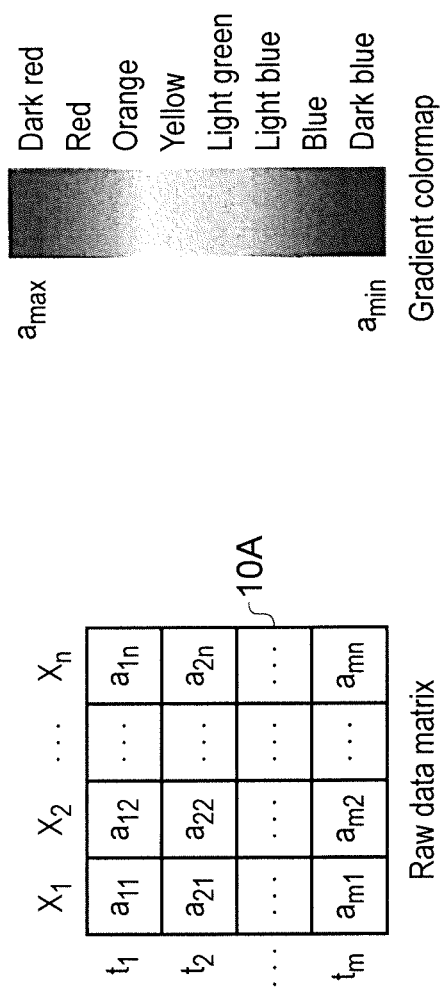
FIG. 2a
FIG. 2b

FIG. 6 (a) RGB image
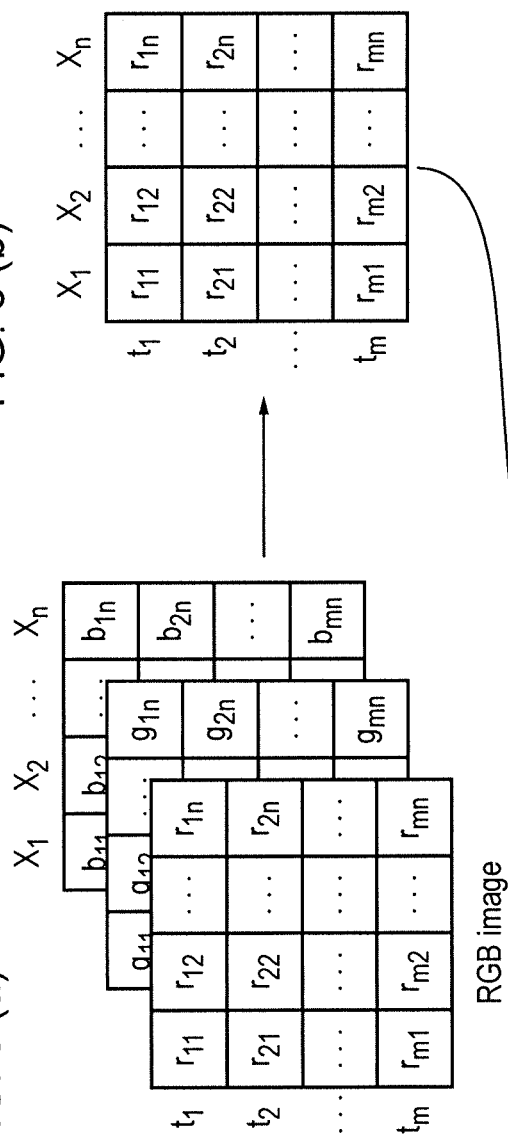
FIG. 6 (b)
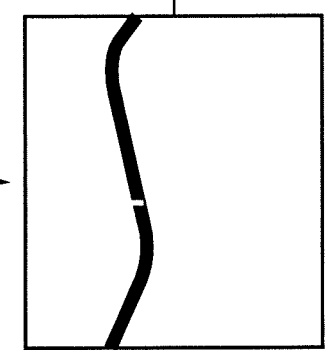
FIG. 6 (c) Red only image
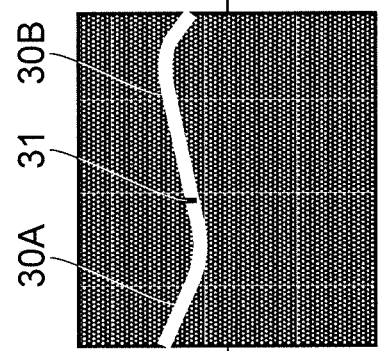
FIG. 6 (d) Threshold
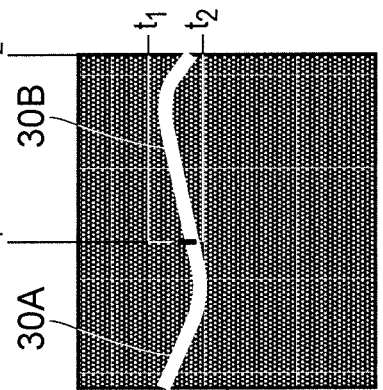
FIG. 6 (e) Bounding box

PROCESSING DIGITAL IMAGE TO REMOVE UNWANTED PORTION

CROSS-REFERENCE TO RELATED APPLICATIONS

This application is a continuation of International Patent Application No. PCT/GB2017/053050, filed on Oct. 9, 2017 which is based on and claims the benefit of U.K. Application No. 1617444.3, filed Oct. 14, 2016, in the United Kingdom Intellectual Property Office, the disclosures of which are incorporated herein by reference.

BACKGROUND

Field

Embodiments discussed herein relate to an image processing method for removing an unwanted portion of a digital image, and a corresponding image processing apparatus and computer program.

Description of the Related Art

An image, such as an image of a location or an object, may contain information which allows certain tasks to be performed. For example, an image such as an ultrasound scan of an object can be analysed to identify structural defects within the object, as discussed in more detail below, or a photograph or still video image can be examined to determine whether a particular item is present in the image.

Ultrasonic non-destructive testing (NDT) is a non-invasive technique that is used for determining the integrity of materials, such as fiberglass used in manufacturing, or structures, and enables the detection of internal defects in the test object. In this technique, one or more ultrasound probes emit sound waves that propagate inside the object and receive the echoes resulting from interactions with the internal structures. The distance of the reflector material can be accurately estimated based on the speed of the sound wave.

Signals caused by reflections due to flaws, such as discontinuities, wrinkles, trapped objects, air pockets, etc., can be identified in the scans. This technique is widely used in industry as part of manufacturing quality control processes. Currently the detection is a manual process, involving a thorough visual inspection of each section of the scan. Depending on the dimensions of the test object, a trained operator can spend several hours looking through visualisations of the scans in order to identify regions of the structure that may have defects and require physical inspection. The operator uses visual cues, such as structure curvatures or discontinuities, to flag potential defects. This is done through interactive visualisation of the raw scan data, which enables adjustment of saturation thresholds, zooming, etc. Although the operators are highly-trained, the inspection is not guaranteed to have full coverage of all defects due to noise in the raw data, resulting from the propagation of echoes, and/or issues with the visualisation.

In other technical applications, non-ultrasound images, such as photographs, still video images, etc., may be automatically examined to determine whether particular objects are present in the image, but where only a portion of the image is relevant and/or of interest, this process can be wasteful of computing resources and unnecessarily time-consuming.

It is therefore desirable to provide an image processing method and apparatus which can be used to improve analysis of data in images.

SUMMARY

According to an embodiment of an aspect there is provided an image processing method for removing an unwanted portion of a digital image, which method comprises: sampling the image to generate a set of image patches representing the entire image, which image contains a portion of interest; extracting feature vectors from the image patches; partitioning the extracted feature vectors into a plurality of clusters, where feature vectors in the same cluster share a common characteristic; segmenting the portion of interest in the image into a set of segments; carrying out an aggregate bounding region creation process comprising: finding the largest segment in the set of segments and creating a bounding box around that segment; determining which image cluster contains the most image patches within the bounding box of the segment; and adding the image patches of the determined image cluster to an aggregate bounding region for the portion of interest; repeating the aggregate bounding region creation process for each other segment in the set of segments in order of size, the resulting aggregate bounding region containing all the image patches associated with the portion of interest; and removing from the image the image patches which fall outside the resulting aggregate bounding region.

Segmenting the portion of interest may comprise searching the image to locate the portion of interest, for example by extracting from the image at least one portion where a preselected attribute of pixels in that portion of the image has a desired characteristic, and identifying within the portion of interest at least one component, each such component forming a segment.

The image from which unwanted portions are to be removed may be obtained by converting non-image data relating to an object under consideration, such that an attribute of pixels in the image is associated with a parameter of the non-image data. For example, the non-image data may be obtained through ultrasound scanning of the object under consideration.

The object under consideration may, for example, be at least one of: a manufactured object; and an object used in manufacture.

The non-image data relating to the object under consideration may, for example, be used to determine at least one of: the structural integrity of material forming at least part of the object; and flaws in material forming at least part of the object.

According to an embodiment of a second aspect there is provided a defect detection method for use in detecting a defect in an object under consideration, in which method an image of, or derived from, the object is analyzed to identify such a defect, where the image to be analyzed is an image from which unwanted portions have been removed in accordance with a method embodying the first aspect of the present invention.

The object under consideration may, for example, be at least one of: a manufactured object; and an object used in manufacture.

The image from which unwanted portions are to be removed may be obtained by converting non-image data relating to the object under consideration, which non-image data may be used to determine at least one of: the structural integrity of material forming at least part of the object; and flaws in material forming at least part of the object.

According to an embodiment of a third aspect there is provided a computer program which, when run on a computer, causes that computer to carry out a method embodying the first or second aspect of the present invention.

According to an embodiment of a fourth aspect there is provided an image processing apparatus for removing an unwanted portion of a digital image, which apparatus comprises: an image sampler configured to sample the image to generate a set of image patches representing the entire image, which image contains a portion of interest; a feature extractor configured to extract feature vectors from the image patches; a feature clusterer configured to partition the extracted feature vectors into a plurality of clusters, where feature vectors in the same cluster share a common characteristic; an image segmenter configured to segment the portion of interest in the image into a set of segments; a structure detector configured to carry out an aggregate bounding region creation process comprising finding the largest segment in the set of segments and creating a bounding box around that segment, determining which image cluster contains the most image patches within the bounding box of the segment, and adding the image patches of the determined image cluster to an aggregate bounding region for the portion of interest, the structure detector being operable to repeat the aggregate bounding region creation process for each other segment in the set of segments in order of size, the resulting aggregate bounding region containing all the image patches associated with the portion of interest; and a data filter configured to remove from the image the image patches which fall outside the resulting aggregate bounding region.

The image segmenter may be operable to search the image to locate the portion of interest, for example by extracting from the image at least one portion where a preselected attribute of pixels in that portion of the image has a desired characteristic, and identifying within the portion of interest at least one component, each such component forming a segment.

Apparatus embodying the fourth aspect may further comprise a data-to-image converter configured to convert non-image data, relating to an object under consideration, to the image from which unwanted portions are to be removed, such that an attribute of pixels in the image is associated with a parameter of the non-image data. For example, the non-image data may be ultrasound scan data of the object under consideration.

The object under consideration may, for example, be at least one of: a manufactured object; and an object used in manufacture.

The non-image data relating to the object under consideration may, for example, be used to determine at least one of: the structural integrity of material forming at least part of the object; and flaws in material forming at least part of the object.

In the context of a method or apparatus in accordance with the embodiment, an unwanted portion of a digital image may comprise irrelevant data, for example a part of the image which corresponds to noise in data from which the image was derived or another extraneous portion of the image.

A method and apparatus according to the embodiments can enable automatic and accurate detection of regions of interest in an image. By filtering out irrelevant data (for example, noise or extraneous portions) in an image, visual inspection of the image by a technician may be made easier and/or more efficient.

For example, by automating parts of the inspection process related to ultrasound scan data analysis, quality control engineers/technicians can carry out their inspections in more efficient ways, taking less time per test object and hence reducing the overall human effort and costs. A method/apparatus in accordance with the embodiments is particularly (but not exclusively) useful when applied to NDT ultrasound images where the test object includes a large structure such as a back wall.

Furthermore, automatic defect detection using a machine learning methodology may be made possible. Training data for machine learning-based defect detection approaches may be generated using a method/apparatus embodying the present invention.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

These and/or other aspects and advantages will become apparent and more readily appreciated from the following description of the embodiments, taken in conjunction with the accompanying drawings. Reference will now be made, by way of example, to the accompanying drawings, in which:

FIG. 1 is a block diagram of an embodiment of an apparatus including an image processing apparatus;

FIG. 2a depicts a data matrix;

FIG. 2b depicts a gradient colourmap;

FIGS. 6(a) to (e) are diagrams for use in explaining an image segmentation process;

DETAILED DESCRIPTION

Figure 3:
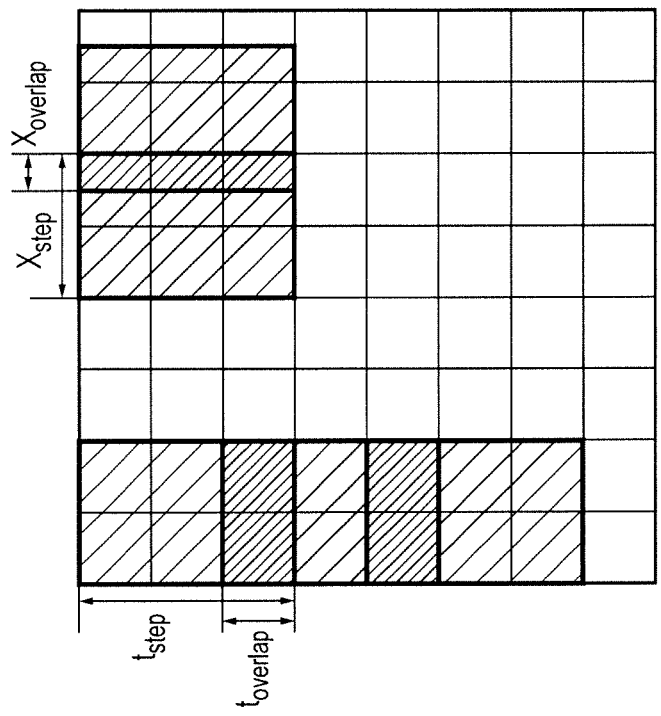
FIG. 3 is a diagram for use in explaining an image sampling process.

Reference will now be made in detail to the present embodiments of the present invention, examples of which are illustrated in the accompanying drawings, wherein like reference numerals refer to the like elements throughout. The embodiments are described below to explain the present invention by referring to the figures. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

An embodiment comprises an automatic image processing method and an image processing apparatus for removing an unwanted portion of a digital image. By way of example only, an embodiment applied to ultrasound images to be analyzed will now be described in a case where the image processing process is a pre-processing stage of a defect detection process.

FIG. 1 shows a block diagram of an image processing apparatus 100 in accordance with an embodiment, which feeds into a defect detection module (defect detector) 7. Image processing apparatus 100 comprises a visualisation module (data-to-image converter and image sampler) 1, a feature extraction module (feature extractor) 2, an image segmentation module (image segmenter) 3, a feature clustering module (feature clusterer) 4, a structure detection module (detector) 5 and a data filtering module (data filter) 6. Modules 1 to 6 are described below.

1. Visualisation

In this embodiment the visualisation module 1 takes as input raw (i.e. unprocessed) scan data from an ultrasound scan of an object under investigation. The raw scan data in this example comprises amplitudes of the echo signals along two dimensions, a distance x from the tip of object, and a time t elapsed between emittance of the sound wave and measurement of the echo signal amplitude. In this example this data is represented as a matrix or 2-dimensional data structure 10A, as shown in FIG. 2a in which echo signal amplitude values $a_{11}$, $a_{12}$, . . . , $a_{mn}$ are assigned to rows $t_1$, $t_2$, . . . , $t_m$ and columns $x_1$, $x_2$, . . . , $x_n$. The visualisation module 1 maps each amplitude value to an RGB colour determined by a fixed colour gradient (shown in FIG. 2b) that ranges, for example, from dark blue for the minimum amplitude $a_{min}$ to dark red for the maximum amplitude $a_{max}$. The resulting image is a pixel-map, where the colour of each pixel encodes an amplitude value. Alternative colour mappings may be used providing that the colour(s) assigned in the plot to the higher amplitudes is/are visually distinct from the other colours in the plot. Furthermore, it may be possible to use other methods to map data to images in which an attribute of the image pixels other than colour is assigned to a characteristic feature (parameter) of the data, provided that different values of the data can be readily distinguished in the image.

Figure 4:
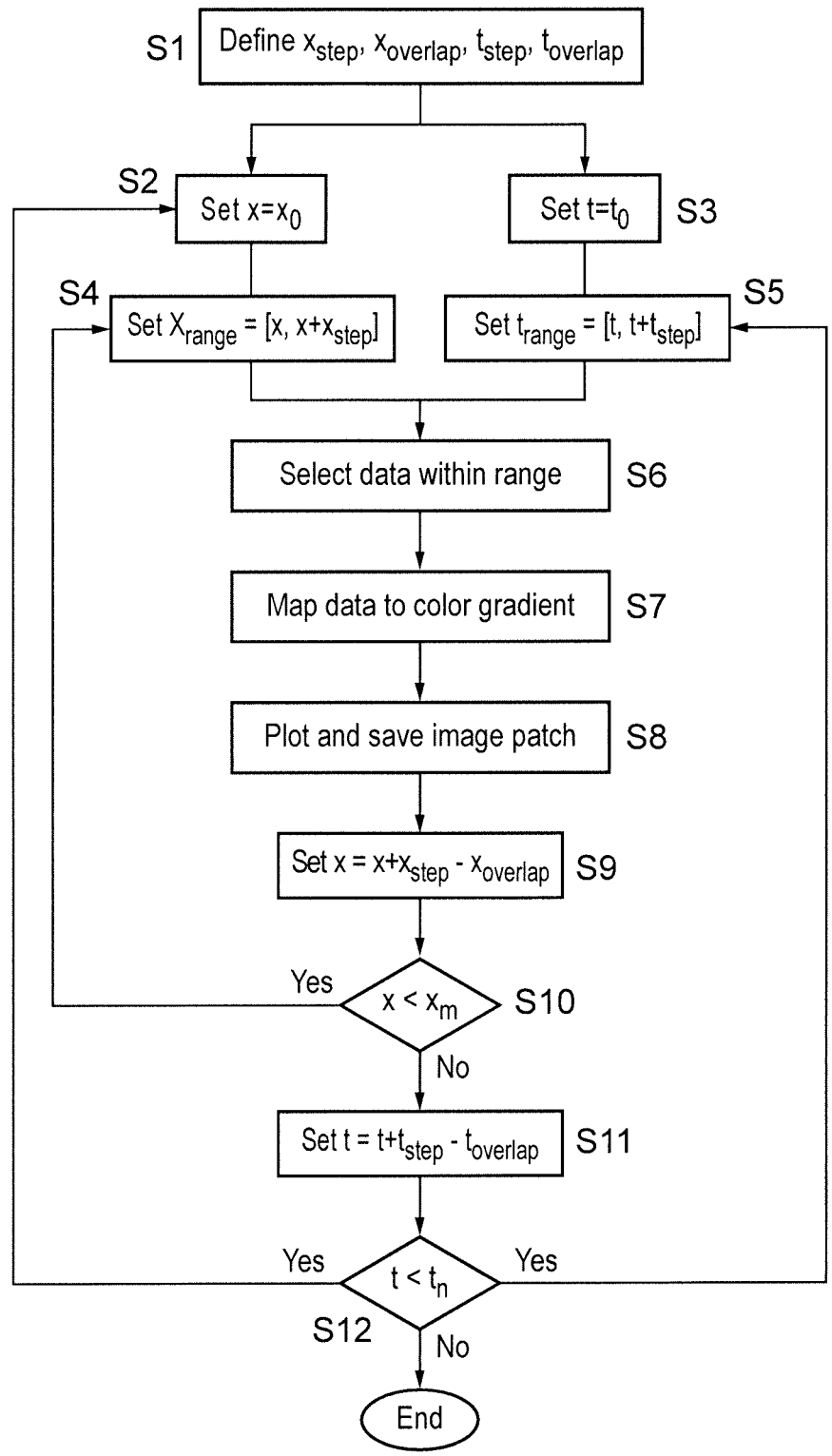
FIG. 4 is a flowchart for use in explaining the image sampling process.

The visualisation module 1 is also configured to sample the image (pixel-map) to generate a set of image patches representing the entire image, which image contains a portion of interest. The visualisation module 1 is parameterised to enable plotting of the whole scan or just sections of the scan. As shown in FIG. 3, the visualisation module 1 takes as input four parameters, $x_{step}$, $x_{overlap}$, $t_{step}$ and $t_{overlap}$, to retrieve several samples of the scan data and generate overlapping image patches. Although in this embodiment overlapping patches are generated in order to provide a more granular view of the scan, it is not essential that the image patches overlap. The process carried out by the visualisation module 1 to generate the scan image patches is detailed in the flowchart of FIG. 4.

In operation 1, parameters $x_{step}$, $x_{overlap}$, $t_{step}$ and $t_{overlap}$ are defined. In operations S2 and S3 respectively, x is set equal to $x_0$ and t is set equal to $t_0$. In operations S4 and S5 respectively sliding windows $x_{range}=[x, x+x_{step}]$ and $t_{range}=[t, t+t_{step}]$ are defined. The generated image patches result from sampling the data within the provided range (operations S6 to S8). In operation S9 x is set equal to $x+x_{step}-x_{overlap}$, and in operation S10 is compared to $x_m$, a maximum value for x. If x is less than $x_m$, then the process returns to operation S4, and operations S4 and S6 to S10 are repeated until x is equal to $x_m$. The process then moves onto operation S11. In operation S11 t is set equal to $t+t_{step}-t_{overlap}$, and in operation S12 is compared to $t_n$, a maximum value for t. If t is less than $t_n$ then the process returns to operations S2 and S5, and operations S4 to S12 are repeated until t is equal to $t_n$. The process finishes when the whole matrix has been plotted.

2. Feature Extraction

In the present embodiment feature extraction module 2 is configured to extract feature vectors from the image patches generated by the visualisation module 1, each feature vector representing a feature of the image patches. There are many possible ways of computing feature vector representations of images. In this embodiment, feature extraction module 2 uses a deep-learning based machine vision technique. Such techniques are well known in the art and have been proven to capture the important visual characteristics of an image. A well-known example of a deep neural network (DNN) trained for image recognition is a convolutional neural network architecture called AlexNet. This network takes as input RGB images of size 256×256 pixels and is able to classify them into 1000 different categories.

Figure 5:
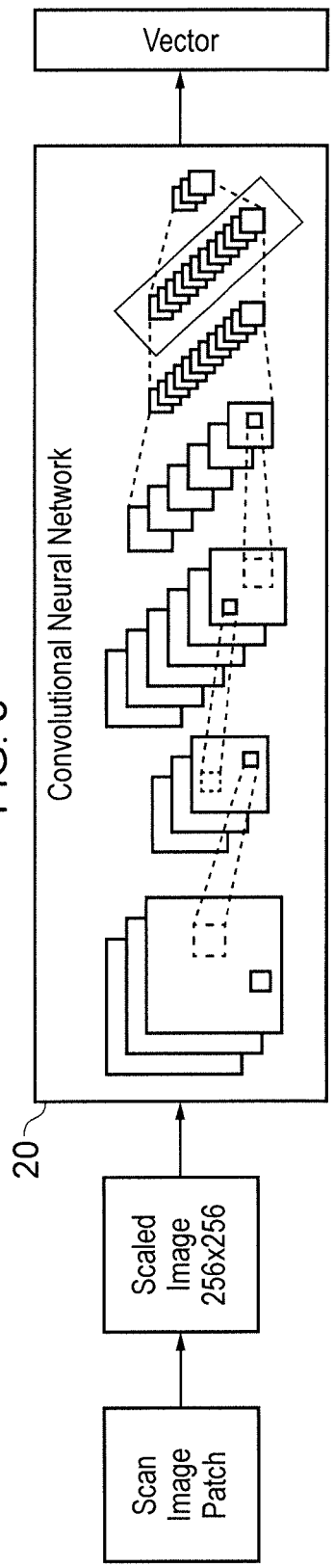
FIG. 5 is a block diagram for use in explaining feature extraction.

As illustrated in FIG. 5, such a DNN 20 can be used for feature extraction by feeding an image to the network, performing the feed-forward step and exporting the data found in one of the final layers as a vector of values which represent the features. For example, if data is extracted from the last layer (named "fc8" in AlexNet), the network becomes a feature extractor which converts an arbitrary 256×256 RBG image to a vector with 1000 real-valued elements.

3. Image Segmentation

Image segmentation is a process of partitioning a digital image into multiple segments in order to simplify or change the representation of an image into something more meaningful or easier to analyse. It is typically used to locate objects and boundaries in images. In image segmentation labels are assigned to every pixel in an image such that pixels sharing a certain characteristic are assigned the same label.

The image segmentation module 3 of the present invention segments the portion of interest in the image into a set of segments. In the present embodiment, in order to locate a specific structure of interest in the image, the image segmentation module 3 searches for the largest portion of a given colour in the image (e.g. red in FIG. 6), which corresponds to the largest object with an echo signal of a given amplitude.

Firstly, as shown in FIG. 6(a), the image to be segmented is converted to a 3D matrix of shape [x, t, 3], where each [x, t, i] represents pixel intensities for each colour (red, green and blue). The 2D matrix of colour values of the given colour component is then extracted, as shown in FIG. 6(b). The resulting matrix of values is thresholded and inverted to result in a binary black and white image, where white components represent different 'objects' 30A, 30B where the intensity of the original value is less than some fixed value which is preset to calibrate the search to find the structure of interest in the image (FIGS. 6(c), and (d)). The white objects 30A, 30B in these Figures are separated by a black gap 31 which may represent the location of a defect, or correspond to a section of the object which was not properly scanned. The area of each object 30A, 30B is taken as the number of pixels in each object and the largest object is taken to be the object with the largest area (in this example, object 30B). The smallest and largest coordinates of the largest object in the x dimension ($x_1$ and $x_2$ respectively) and in the t dimension ($t_1$ and $t_2$ respectively) are calculated so that a bounding box for the largest object can be defined at (($x_1,t_1$), ($x_1$, $t_2$), ($x_2$, $t_2$), ($x_2$, $t_1$)) (FIG. 6(e)). This process of identifying the largest object is then repeated successively as required to find the next largest object amongst the remaining objects (i.e. excluding the largest object(s) already identified) until all the objects are defined by a bounding box, thereby segmenting the portion of interest.

4. Feature Clustering

Feature clustering module 4 is configured to partition the feature vectors extracted by the feature extraction module 2 into a plurality of clusters, where feature vectors in the same cluster share a common characteristic. Cluster analysis is the task of grouping a set of objects in such a way that objects in the same group, i.e. "cluster", are more similar (in some way) to each other than to those in other clusters. Popular partitioning methods such as k-Means are widely used in many application domains for their simplicity and computational efficiency. This embodiment uses k-Means, but any other clustering algorithm could be selected.

Figure 7:
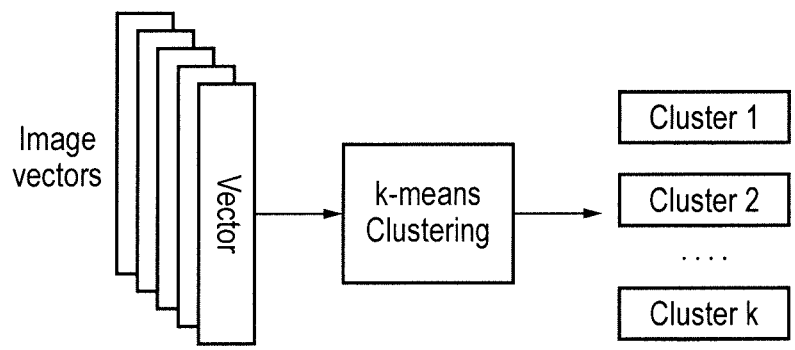
FIG. 7 is a diagram for use in explaining a feature clustering process.

The basic goal of the feature clustering module 4 is to partition the set of image vectors resulting from the feature extraction module 2 into a number of clusters, as shown in FIG. 7. In the case of k-Means the number of clusters needs to be pre-defined based on domain knowledge, but in more complex algorithms this number is discovered by the algorithm itself.

By means of the clusters the scan image patches are sorted according to the similarity of the respective image vectors, such that images assigned to a particular cluster are expected to be more visually similar to each other than to images assigned to other clusters. The vector similarity can be computed using, for example, the cosine similarity measure.

Although the clustering enables the grouping of particular structures present in the scanned object, it does not assign any labels or semantics to such structures. Further processing is required to identify which cluster corresponds to a particular structure, as discussed below.

5. Structure Detection

Figure 8:
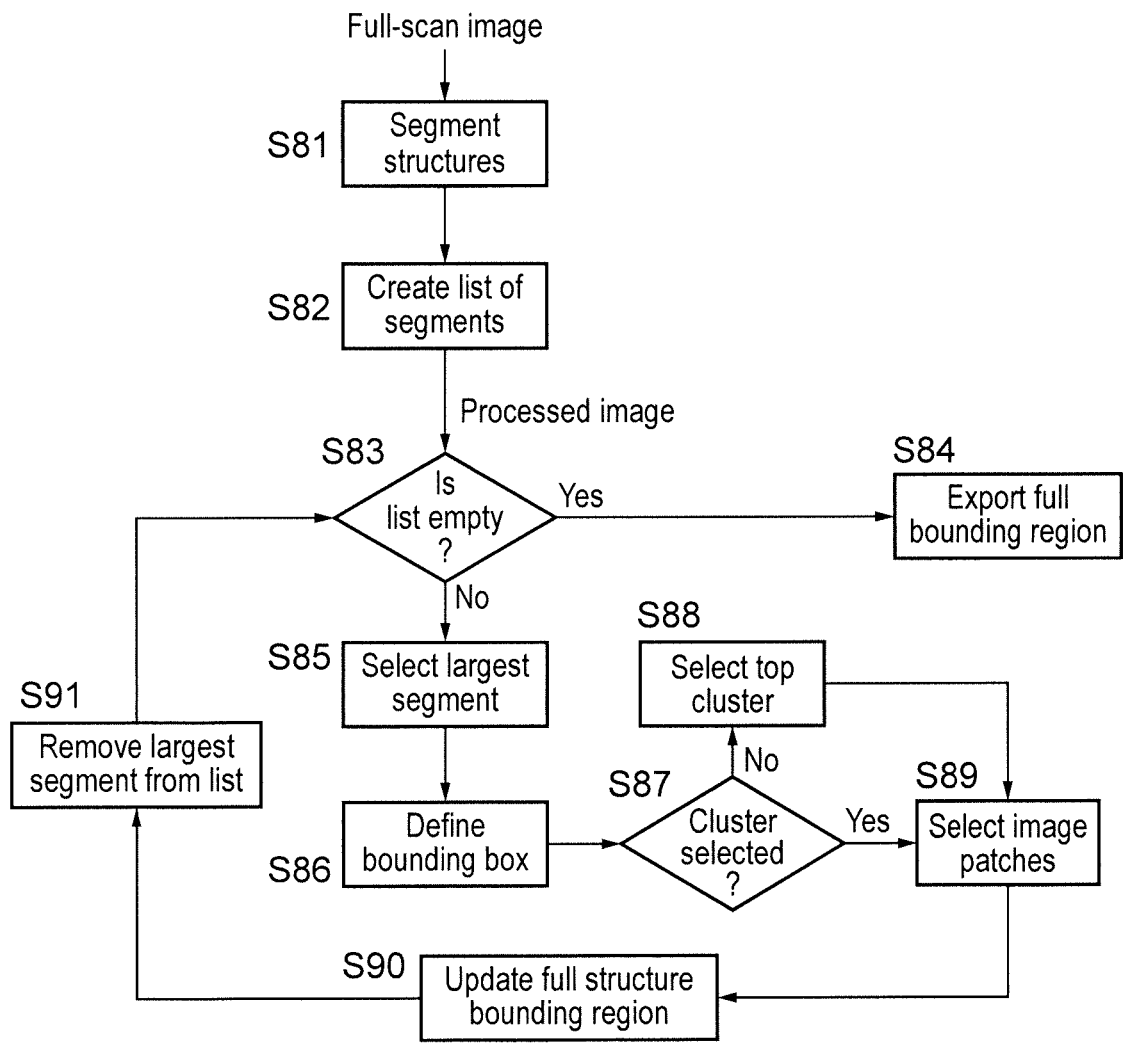
FIG. 8 is a flowchart for use in explaining a method including an image processing method in accordance with an embodiment.

The structure detection module 5 is configured to use the outputs of the image segmentation module 3 and image clustering module 4 to carry out an aggregate bounding region creation process which creates an aggregate bounding region containing all the image patches associated with the portion of interest. The aggregate bounding region creation process comprises finding the largest segment in the set of segments and creating a bounding box around that segment, determining which image cluster contains the most image patches within the bounding box of the segment, and adding the image patches of the determined image cluster to an aggregate bounding region for the portion of interest. The aggregate bounding region creation process is repeated for each other segment in the set of segments in order of size. Operation of a method embodying the present invention, which uses the structure detection module 5, will now be explained with reference to the flowchart of FIG. 8.

Figure 9:
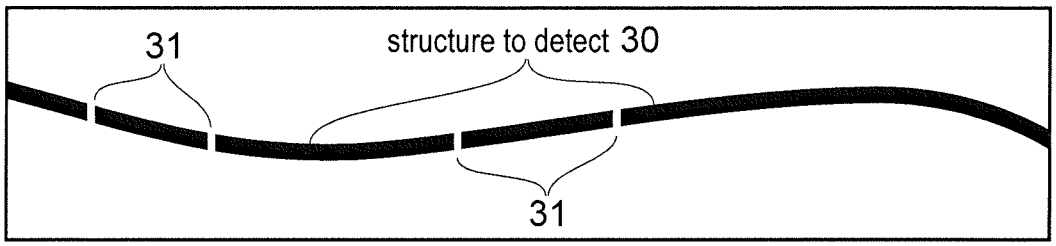
FIG. 9 depicts a full-scan image with a portion of interest.

As mentioned above, the parameter values used by the image segmentation module 3 are set ("tuned") to identify a specific structure of interest (e.g. the back wall of the object under investigation). It is assumed this structure stands out as at least one relatively large region 30 of the full scan image, as shown in FIG. 9.

Figure 10A:
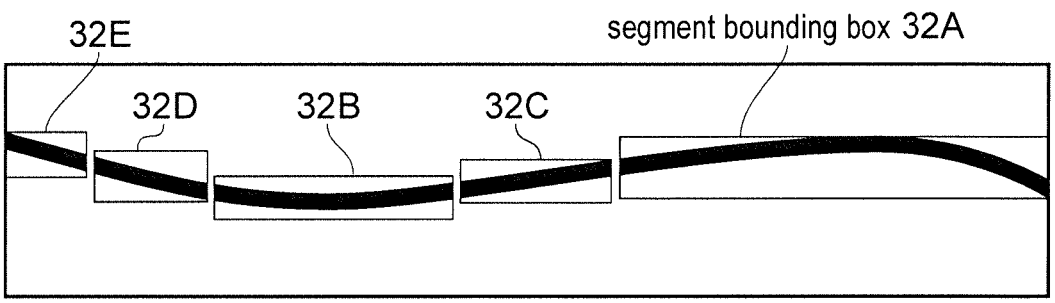
FIG. 10a depicts the image of FIG. 9 when the portion of interest has been segmented.

The process starts (operation S81) with the image segmentation module 3 identifying at least one possibly significant segment of the structure of interest and creating a list of all such segments identified (S82) (as described above with reference to FIG. 6). After confirming at operation S83 that the list is not empty ("No"), the image segmentation module 3 then selects (S85) the largest segment from the list and defines the bounding box 32A that encloses it (S86), extracting its coordinates ($t_0$, $x_0$) for the top-left corner, and ($t_1$, $x_2$) for the bottom-right corner, as shown in FIG. 10a.

Figure 10B:
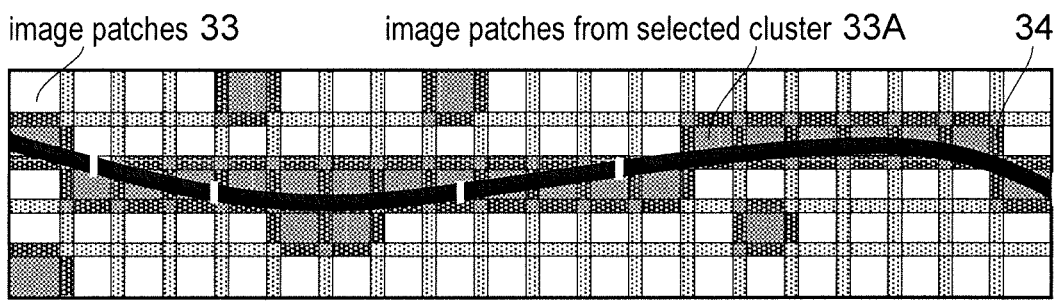
FIG. 10b depicts the image of FIG. 10a showing image patches corresponding to the segmented portions within an aggregate bounding region.

In its first iteration, the process carried out by the structure detection module 5 checks which of the image clusters (hereafter called the "top cluster") produced by the image clustering module 4 contains the most patches 33 within the segmented bounding box 32A, as shown in FIG. 10b (operations S87, S88). In the case of a tie, more than one cluster may be selected as a top cluster.

The process continues by adding the image patches of each top cluster (33A in FIG. 10b) identified in that iteration of the process to an aggregate bounding region 34 for the whole structure (operations S89, S90). The previous largest segment is then eliminated from the initial list (operation S91), after which the process returns to operation S83 and the remaining segments 33B, 33C, 33D, 33E are then processed in order of decreasing size until no further segments are left in the list ("Processed image Yes", operation S83). The output of this process (operation S84) is the aggregate (overall) bounding region 34 containing all of the selected identified image patches, as shown in FIG. 10b.

6. Data Filtering

Figure 11:
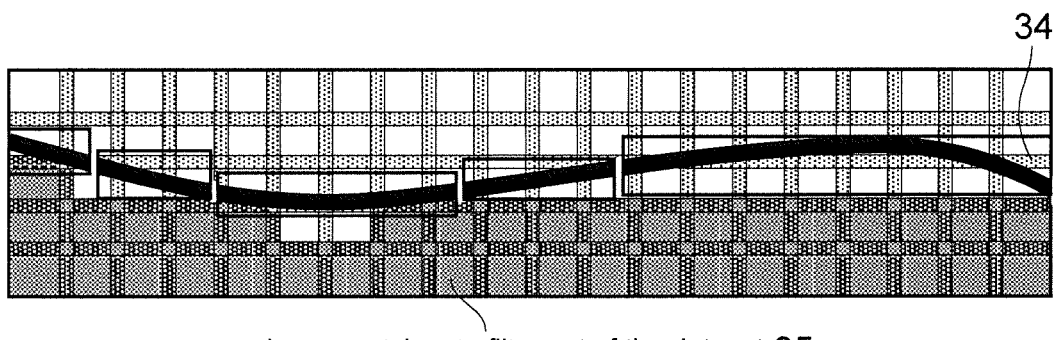
FIG. 11 depicts the image of FIG. 10b showing image patches which are to be filtered out.

The data filtering module 6 is configured to remove from the original image the image patches 35 which fall outside the aggregate bounding region 34, as shown in FIG. 11. For example, in cases where the image segmentation module 3 identifies the back wall of a test object, it may be desirable to eliminate areas of the scan below the back wall, which represent noise due to reflections. Such areas correspond to echoes received at higher values of t. Therefore, in this example, the data filtering process carried out by the data filtering module 6 checks and eliminates image patches with a range of t values higher than the maximum t of the bounding region.

7. Defect Detection

As mentioned above, in this embodiment the filtered image which is output from the image processing apparatus 100 is fed into a defect detection module 7. The precise nature of the defect detection module 7 is not the subject of the present invention. However, one possible implementation can use a supervised machine learning approach. In such a case, the image processing apparatus 100 would generate image patches for a set of sample scans, and eliminate the noise from the patches with the above-described process. It would then label each patch against known defect locations as either being positive or negative examples of defects. Then, the feature extraction module 2 would be applied to generate a training set of labelled image vectors. A standard machine learning methodology would then be followed, using the training set to train the learning model to distinguish between defect and non-defect patches. For example, a simple classifier such as kNN (k-Nearest Neighbour) could be applied to determine whether a patch from a new scan falls into the defect class or the non-defect class.

Example

A particular application of an image processing method embodying the present invention will now be described with reference to FIGS. 12 to 17.

For example purposes, we consider a fiberglass pipe 120 as the test object. Fiberglass is widely used in manufacturing of large structures that benefit from being light weight, while having high strength and durability properties. Early applications of fiberglass came from the aviation and aerospace industries for aircraft design. Nowadays, there are many other applications including ship hulls, pipes, surfboards, wind turbine blades, automobile body parts, water slides, pole vaulting poles, among others. Any manufacturing anomalies in such objects can have a significant impact on their structural integrity.

Figure 12:
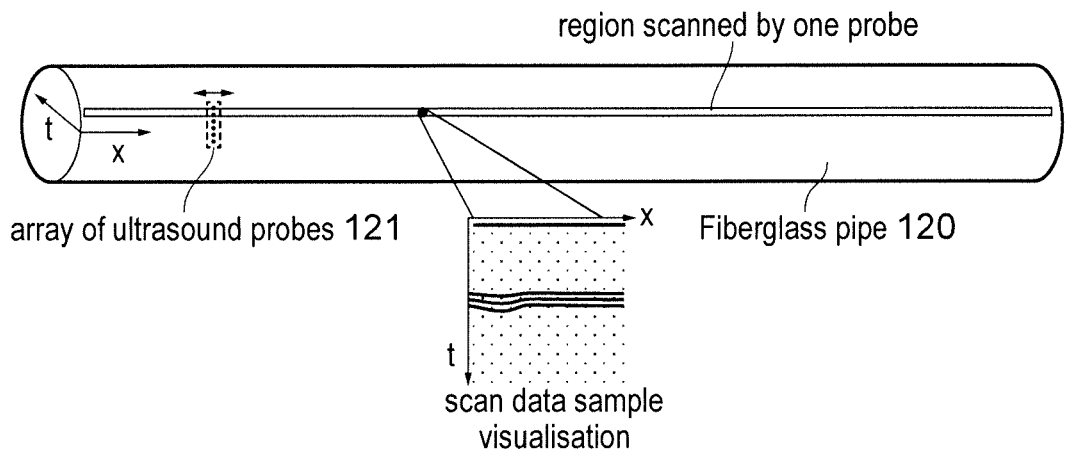
FIG. 12 is a diagram of a pipe undergoing ultrasonic NDT scanning for use in explaining a method in accordance with an embodiment.

Ultrasonic NDT scanning is performed by an array of probes 121, which emit sound waves that propagate inside the pipe structure 120 and receive the echoes resulting from interactions with its front and back walls (FIG. 12). The amplitude of the echoes is measured along two dimensions, length x which is measured in a direction parallel to the length of the pipe 120, and time t. The resulting data can be represented as a numerical matrix with echo amplitudes, where each row i corresponds to a given propagation time $t_i$ and each column j corresponds to a given horizontal position $x_j$. The raw data matrix can be visualised by mapping a colour gradient to the amplitude values of the echoes (e.g. a gradient from deep blue to dark red), as illustrated in the scan data sample visualisation process described above.

Figure 13:
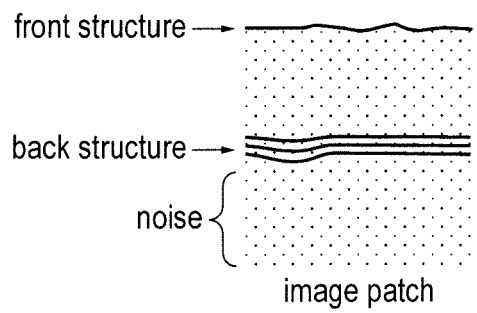
FIG. 13 shows an example of an image patch from an image produced as a result of the ultrasonic scanning of FIG. 12.
Figure 14:
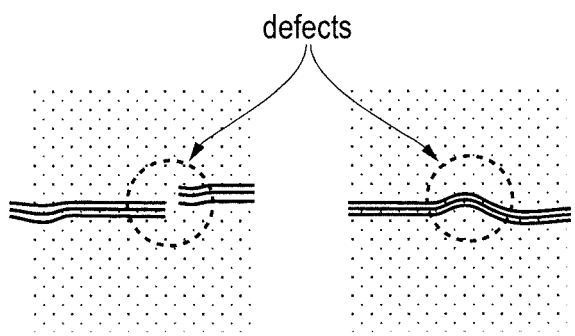
FIG. 14 shows two example image patches showing potential defects in the pipe.

The front and back structures of the test object are easily identifiable in the visualisation, since the amplitudes of the echoes they produce usually stand out as dark coloured regions, as shown in the image patch of FIG. 13, hence making it easy to inspect for defects. Defects such as wrinkles in the fibreglass layers bring about distinct visual patterns in the scan, such as discontinuities or curvatures in the back structure region, as shown in FIG. 14.

The data visualised below the structure (see FIG. 13) constitutes noise and is thus irrelevant for the inspection process.

Figure 15:
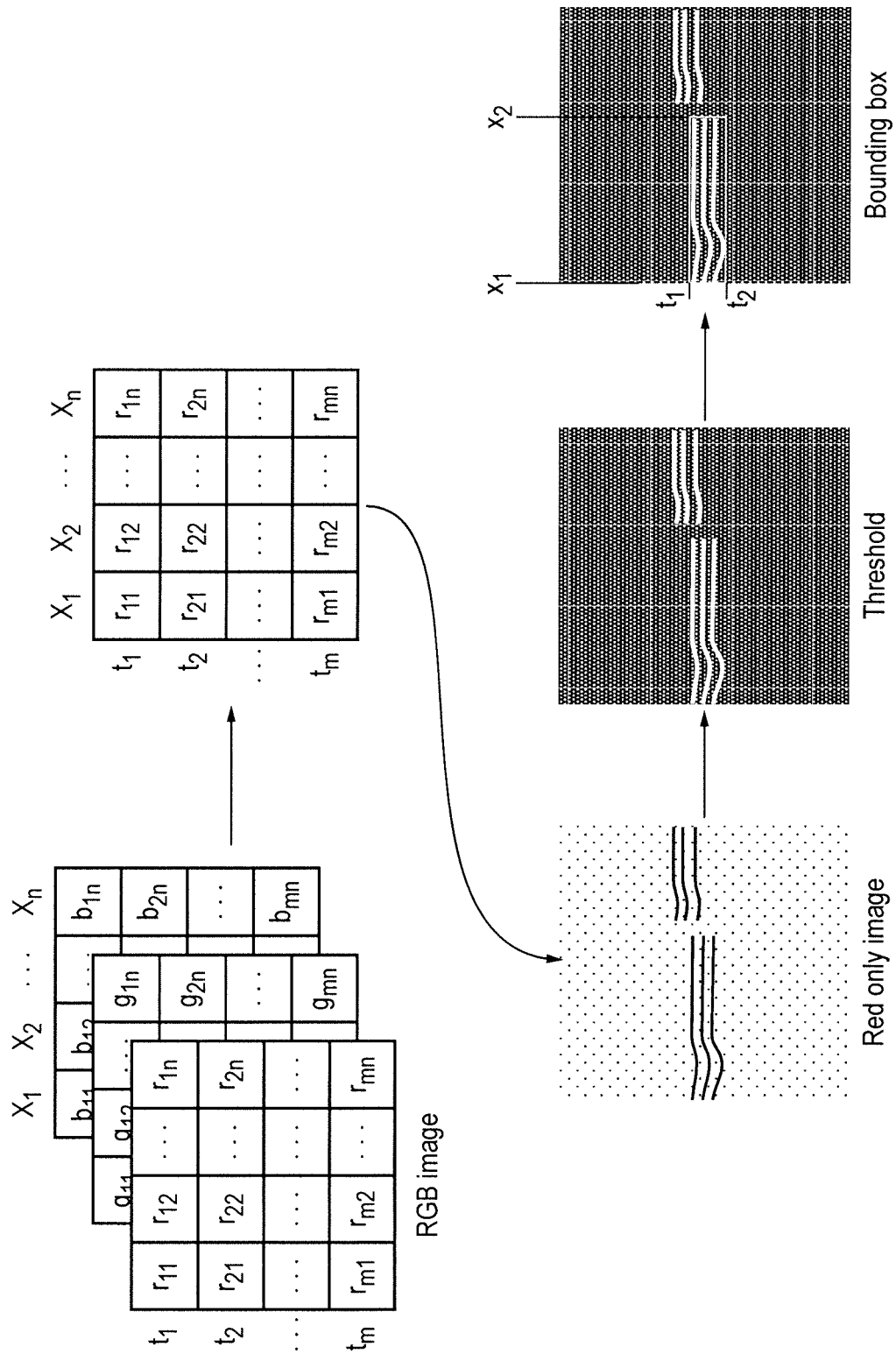
FIGS. 15 and 16 are diagrams for use in explaining application of the image segmentation process of FIGS. 6(a) to (e) to one of the image patches of FIG. 14.

The method starts with segmentation of the scan visualisation patches. As shown in FIG. 15, each patch is segmented into multiple objects by extracting the desired component (red in this case) as a separate image, which is then thresholded and inverted as previously described, resulting in two objects, both part of the back structure. The area is calculated for each object, and a bounding box is drawn around the largest.

Figure 16:
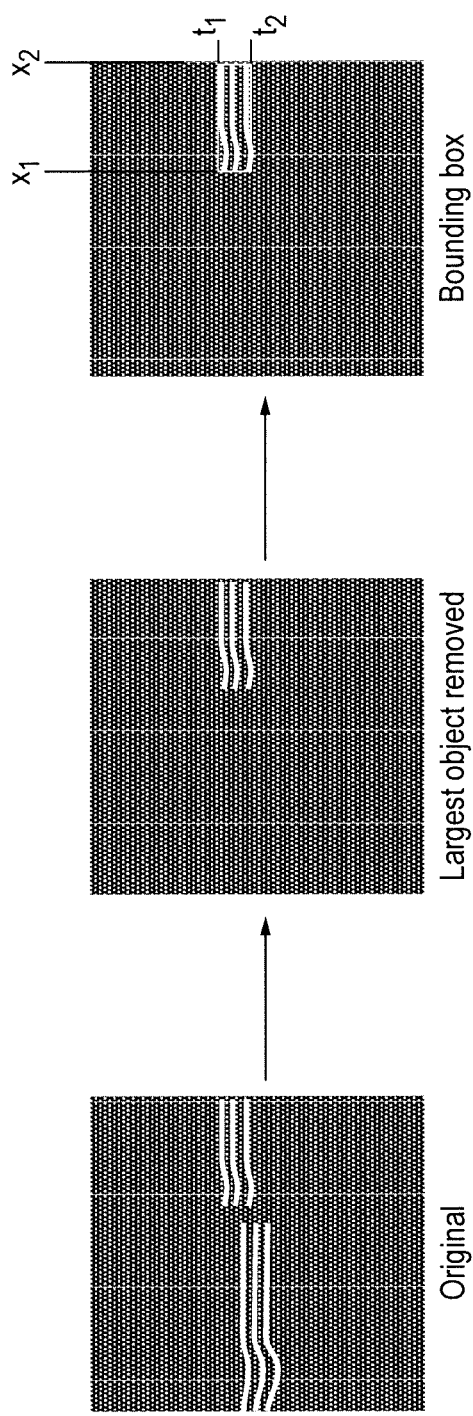
Figure 17:
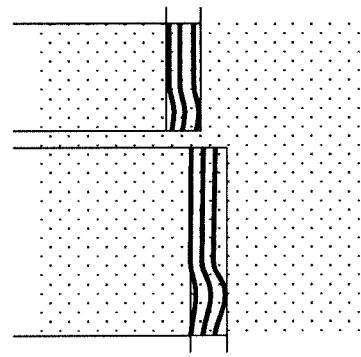
FIG. 17 is a diagram showing the aggregate bounding region for the segmented image patch.

As shown in FIG. 16, the largest object identified in the image is removed from the image, and a bounding box is drawn around the largest object that remains, i.e. the second half of the back wall. With this second object removed, no objects remain. The bounding boxes of the objects identified by this process provide an approximation of the location of the back structure (FIG. 17).

The same approach can be applied to non-ultrasound images, which have a dominant large object that needs to be detected and segmented. For example, a CCTV camera capturing footage from a particular motorway may include imagery from both the motorway lanes and the hard-shoulder. In some applications, one may want to detect cars driving illegally on the hard shoulder. In another application, one may want to reduce the size of the image data file by eliminating irrelevant parts of the image, for example where cars are not present. An embodiment of the present invention could be applied to segment the white line that separates the main road from the hard shoulder.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, or provided on a carrier signal, or in any other form.

Figure 18:
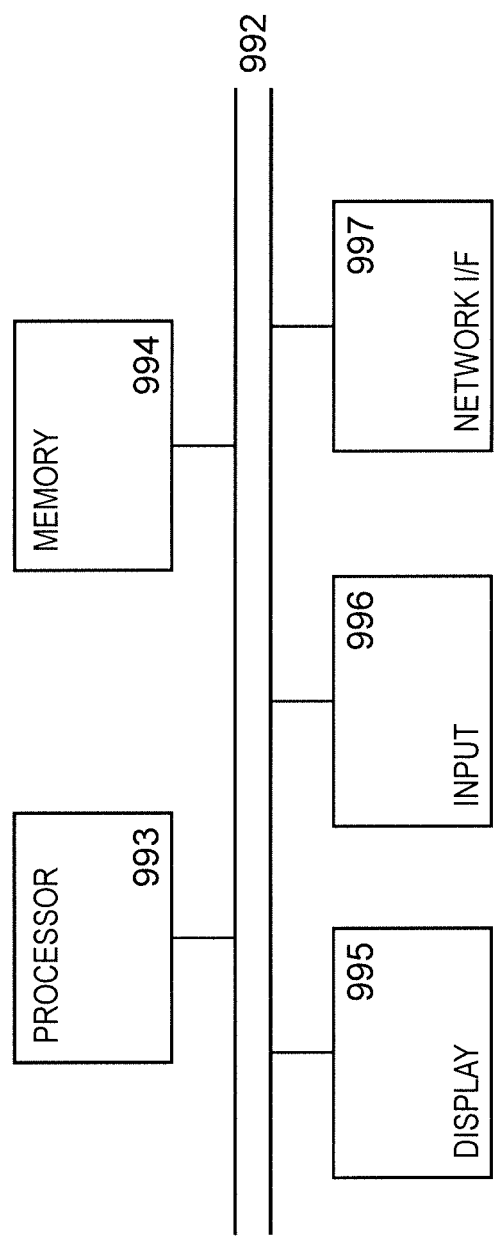
FIG. 18 is a block diagram of a computing device in accordance with an embodiment.

FIG. 18 is a block diagram of a computing device, such as a data storage server, which embodies the present invention, and which may be used to implement some or all of the steps of a method embodying the present invention, and perform some or all of the tasks of apparatus of an embodiment. For example, the computing device of FIG. 18 may be used to implement all the steps of the visualisation method illustrated in FIG. 4 and all the steps of the image processing method illustrated in FIG. 8, and perform all the tasks of the image processing apparatus and defect detector shown in FIG. 1, or only to implement some of the steps in the visualisation method of FIG. 4 and/or only to implement some of the steps in the image processing method of FIG. 8, and only to perform some of the tasks of the image processing apparatus in FIG. 1 and/or only some of the tasks of the defect detector in FIG. 1.

The computing device comprises a processor 993, and memory, 994. Optionally, the computing device also includes a network interface 997 for communication with other such computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure.

The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement the methods described with reference to FIGS. 1, 2, 3, 4, 5, 6, 7, 8, 9, 10, 11, 12, 13, 14, 15, 16 and/or 17 and defined in the claims. For example, such computer program code may implement at least one of: the visualisation module 1; the feature extraction module 2; the image segmentation module 3; the feature clustering module 4; the structure detection module 5; and the data filtering module 6 depicted in FIG. 1 and described earlier. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 995 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network.

Other peripheral devices such as microphone, speakers, printer, power supply unit, fan, case, scanner, trackerball, etc. may be included in the computing device.

Methods embodying the present invention may be carried out on a computing device such as that illustrated in FIG. 18. Such a computing device need not have every component illustrated in FIG. 18, and may be composed of a subset of those components. A method embodying the present invention may be carried out by a single computing device in communication with one or more data storage servers via a network. The computing device may be a data storage itself storing at least a portion of the data.

A method embodying the present invention may be carried out by a plurality of computing devices operating in cooperation with one another. One or more of the plurality of computing devices may be a data storage server storing at least a portion of the data.

The above-described embodiments of the present invention may advantageously be used independently of any other of the embodiments or in any feasible combination with one or more others of the embodiments.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. An image processing method for removing an unwanted portion of a digital image which contains a portion of interest, the method comprising:
   sampling the digital image to generate a set of image patches representing the digital image;
   extracting feature vectors from the image patches;
   partitioning the extracted feature vectors into a plurality of clusters, the extracted feature vectors in the same cluster sharing a common characteristic;
   segmenting the portion of interest of the digital image into a set of segments;
   carrying out an aggregate bounding region creation process comprising:
      finding a largest segment in the set of segments and creating a bounding box around the largest segment;
      determining the image cluster which contains the most image patches within the bounding box around the largest segment; and
      adding the image patches of the determined cluster to an aggregate bounding region for the portion of interest;
   repeating the aggregate bounding region creation process for other segments in the set of segments in order of size, the resulting aggregate bounding region containing all the image patches associated with the portion of interest; and
   removing from the digital image the image patches which fall outside the resulting aggregate bounding region.

2. A method as claimed in claim 1, wherein the segmenting the portion of interest comprises:
   searching the digital image to locate the portion of interest; and
   identifying within the portion of interest at least one component, each such component forming a segment.

3. A method as claimed in claim 2, wherein the searching the digital image comprises:
   extracting from the digital image at least one portion where a preselected attribute of pixels in that portion of the digital image comprises a desired characteristic.

4. A method as claimed in claim 1, wherein the digital image from which the unwanted portion is to be removed is obtained by converting non-image data relating to an object under consideration, such that an attribute of pixels in the digital image is associated with a parameter of the non-image data.

5. A method as claimed in claim 4, wherein the non-image data is obtained through ultrasound scanning of the object under consideration.

6. A method as claimed in claim 4, wherein the object under consideration is at least one of: a manufactured object and an object used in manufacture.

7. A method as claimed in claim 4, wherein the non-image data relating to the object under consideration is used to determine at least one of: the structural integrity of material forming at least part of the object and flaws in material forming at least part of the object.

8. A defect detection method for use in detecting a defect in an object under consideration, comprising analyzing an image of, or derived from, the object to identify such a defect, where the image to be analyzed is an image from which unwanted portions have been removed in accordance with the method of claim 1.

9. A method as claimed in claim 8, wherein the object under consideration is at least one of: a manufactured object and an object used in manufacture.

10. A method as claimed in claim 8, wherein the digital image from which the unwanted portion is to be removed is obtained by converting non-image data relating to the object under consideration, which non-image data is used to determine at least one of: the structural integrity of material forming at least part of the object and flaws in material forming at least part of the object.

11. A non-transitory computer-readable storage medium carrying instructions which, when run on a computer, causes that computer to carry out a method according to claim 1.

12. An image processing apparatus for removing an unwanted portion of a digital image which contains a portion of interest, comprising:
   an image sampler to sample the digital image to generate a set of image patches representing the digital image;
   a feature extractor to extract feature vectors from the image patches;
   a feature clusterer to partition the extracted feature vectors into a plurality of clusters, the feature vectors in the same cluster sharing a common characteristic;
   an image segmenter to segment the portion of interest of the digital image into a set of segments;
   a detector to carry out an aggregate bounding region creation process comprising finding a largest segment in the set of segments and creating a bounding box around the largest segment, determining which of the clusters contains the most image patches within the bounding box around the largest segment, and adding the image patches of the determined cluster to an aggregate bounding region for the portion of interest, the detector repeating the aggregate bounding region creation process for other segments in the set of segments in order of size, the resulting aggregate bounding region containing all the image patches associated with the portion of interest; and
   a data filter to remove from the digital image the image patches which fall outside the resulting aggregate bounding region.

13. Apparatus as claimed in claim 12, wherein the image segmenter is operable to:
   search the digital image to locate the portion of interest; and
   identify within the portion of interest at least one component, each such component forming a segment.

14. Apparatus as claimed in claim 13, wherein the image segmenter is operable to search the digital image for the portion of interest by extracting from the digital image at least one portion where a preselected attribute of pixels in that portion of the digital image comprises a desired characteristic.

15. Apparatus as claimed in claim 12, further comprising a data-to-image converter to convert non-image data, relating to an object under consideration, to the digital image from which unwanted portions are to be removed, such that an attribute of pixels in the digital image is associated with a parameter of the non-image data.

16. Apparatus as claimed in claim 15, wherein the non-image data is ultrasound scan data of the object under consideration.

17. Apparatus as claimed in claim 15, wherein the object under consideration is at least one of: a manufactured object and an object used in manufacture.

18. Apparatus as claimed in claim 15, wherein the non-image data relating to the object under consideration is used to determine at least one of: the structural integrity of material forming at least part of the object and flaws in material forming at least part of the object.

\* \* \* \* \*